(No Model.)
G. W. GILLETTE.
VENT.
No. 327,674. Patented Oct. 6, 1885.
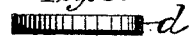
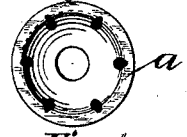
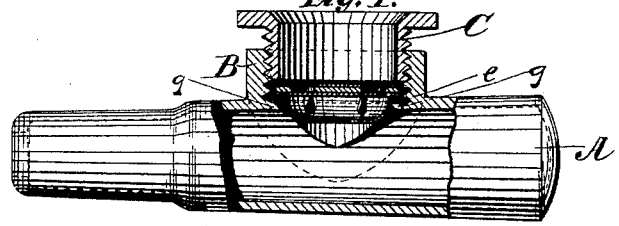
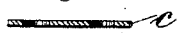
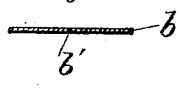
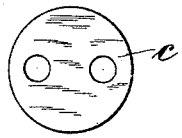
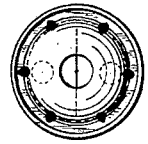
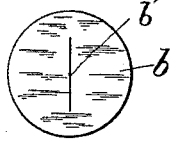
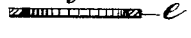
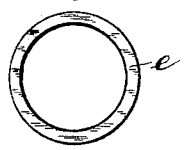
Witnesses:
E. F. Trustellotte
H. J. Skinner
Inventor
George W. Gillette
By
Hubert A. Banning
Attorney.
N. PETERS. Photo-Lithographer. Washington, D. C.

UNITED STATES PATENT OFFICE.

GEORGE W. GILLETTE, OF NEW YORK, N. Y.

VENT.

SPECIFICATION forming part of Letters Patent No. 327,674, dated October 6, 1885.

Application filed July 28, 1885. Serial No. 172,861. (No model.)

*To all whom it may concern:*

Be it known that I, GEORGE W. GILLETTE, of the city of New York, in the county and State of New York, have invented certain new and useful Improvements in Vents for Kegs and Barrels, of which the following is such a full, clear, concise, and exact description as will enable others skilled in the art to which my invention appertains to make and use the same, reference being had to the accompanying drawings, forming part of this specification.

The object of my invention is to produce a vent adapted more particularly for use in beer barrels and kegs, so as to admit the air when the keg is tapped and the faucet turned to draw off the beer, and which will close automatically when the faucet or tap-valve is closed, and one which will be cleanly and not liable to become filled with beer or otherwise stopped up; and it consists in the construction and arrangement of parts, as hereinafter more fully described and claimed.

In the drawings, Figure 1 is a side view of the vent with a portion of its stem broken away, so as to show the interior connections, which in this figure appear in section. Fig. 2 is a central transverse section of the various parts composing the vent proper, and Fig. 3 is a plan view of the same, looking from below. Fig. 4 is a central transverse section of a metallic case having holes therein, and which is made to form the valve-seat, and Fig. 5 is a plan view of the same, looking from below. Fig. 6 is a metallic flanged cover having holes therein and made to inclose, with the metallic case shown in Figs. 4 and 5, the valve and packing, and Fig. 7 is a plan view of this cover. Fig. 8 is a central transverse section of a rubber packing having holes therein, and Fig. 9 is a plan view of the same. Fig. 10 is a transverse section of an elastic valve, and Fig. 11 is a plan view thereof, showing the slit in the same which permits the elastic material to act as a valve. Fig. 12 is a transverse section of a rubber packing-ring, and Fig. 13 is a plan view thereof.

In the construction of the vent I find it convenient to employ the ordinary stem, A, having a nozzle, B, which communicates with a hole in the stem leading to the smaller end thereof, which end penetrates the interior of the keg when the vent is driven into the bung or hole adapted to receive it. I also find it convenient to use an ordinary bushing, C, for securing the interior parts within the nozzle. The construction and arrangements of the several parts which I may secure within the nozzle B by means of a bushing, C, are the principal features of the improvements which I have made and carried into effect.

The innermost part of the vent proper which comes within the nozzle of the stem is a metallic case, a, which I make with holes in the sides and bottom thereof, as shown in Figs. 4 and 5. This case a is flanged, so as to form a seat for the valve b, which I make of gum-elastic, or some very elastic material in which a slit, b', can be made, as shown in Figs. 10 and 11, the slit b' being made to permit it to open and close as a valve, and the elastic material being employed so that it will automatically resume its normal position and shape. This valve b is placed directly over the metallic case a, and so as to rest upon the flanged or flat edge thereof. Next to the valve b, I place a rubber or other suitable packing, c, which has preferably two holes therein, as shown in Figs. 8 and 9. This packing is placed so that the slit in the valve b does not come on a line with the holes in it, but preferably extends in exactly the opposite direction, or crosswise thereof.

Outside of and over the metallic case a and the valve b and packing c, I place a flanged cover, d, which is made of thin metal, as shown in Fig. 6, and which has holes therein, as shown in Fig. 7. This cover is made so as to pass over the rim or flange of the metallic case a, and I prefer to secure it by turning its flange in under the rim of the case a. It will thus be made to secure the several parts of the vent proper together and in their proper positions with relation to each other.

When the several parts are thus arranged and secured, the packing-ring e (shown in Figs. 12 and 13, and which may be of any suitable material, but preferably of rubber) is placed within the nozzle B of the stem A, so that it rests firmly, a short distance from the innermost extremity of such nozzle, upon a slight shoulder or projection, g, formed on the edge of the opening in the nozzle at or near its angle or junction with the hole in the stem A, thus forming a seat for the vent proper. The vent is then placed within the nozzle B, and the flange $f$ thereof made to rest upon the packing-ring $e$, after which the bush C is screwed into the nozzle so as to press against the metallic cover $d$ of the vent, thus holding it firmly against the packing-ring $e$, and when thus secured the vent is ready for use and may be driven into the bung in the ordinary manner.

When the beer is put on draft, the faucet through which it is drawn being turned so as to permit the flow, the air will pass into the nozzle and through the holes in the cover $d$, then through the holes in the packing $c$, so that it exerts a pressure upon the valve $b$, opening the slit which operates by means of the elasticity of the material, as the valve, and passing through this slit it enters the stem A of the vent through the holes in the metallic case $a$ and passes through the stem into the keg or barrel. On the other hand, when the faucet is turned so as to shut off the flow of the liquid, the pressure from the inside, and the tendency of the elastic material from which valve $b$ is made to return to its natural position, causes the valve to close and shut out the air as well as prevent the escape of gas.

It should be noted that whether the faucet is open or closed the vent operates automatically, and, further, that the vent does not become filled with beer and stopped up by sediments, because the holes around the sides or inner edge of the metallic case $a$, where the beer must enter, if at all, permit it to run back into the stem of the vent; and, in addition to this, the air which enters while the valve is open, together with the suction of the faucet, will keep the liquid back until the faucet is closed, and as the valve will close at the same time the pressure from the inside of the keg or vessel will only tend to keep the valve more firmly closed, and under such conditions the beer or other liquid will not pass beyond the valve, and will of course run back through the holes in the metallic case, as before stated. It will therefore be seen that a vent constructed as explained will be more cleanly that the vents heretofore in use, and the necessity for removing the vent in order to clean it will be obviated.

Having thus described my invention, what I claim as new, and desire to secure by Letters Patent, is—

1. In a vent, the combination of an inclosing case and cover having perforations to admit the passage of air, with an elastic slitted valve, and a perforated packing against which the valve when closed is made to bear, both the valve and the packing being inclosed by the case and cover, substantially as described.

2. In combination with the stem A, having a nozzle, B, and bush C, the metallic case $a$ and cover $d$, and the elastic slitted valve $b$ and packing $c$, said valve and packing being inclosed by the case and cover, the same being retained within the nozzle by means of the bush, substantially as described.

GEORGE W. GILLETTE.

Witnesses:
HUBERT A. BANNING,
EDWARD F. TOURTELLOTTE.